United States Patent
Schmalhurst et al.

(10) Patent No.: US 10,849,726 B2
(45) Date of Patent: Dec. 1, 2020

(54) AIR-DRIVEN INTERPROXIMAL TOOTHBRUSH

(71) Applicant: KONINKLIJKE PHILIPS N.V., Eindhoven (NL)

(72) Inventors: Lisa Bethany Schmalhurst, Issaquah, WA (US); Yu-Wen Chang, Mercer Island, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 851 days.

(21) Appl. No.: 15/037,148

(22) PCT Filed: Nov. 20, 2014

(86) PCT No.: PCT/IB2014/066184
§ 371 (c)(1),
(2) Date: May 17, 2016

(87) PCT Pub. No.: WO2015/075654
PCT Pub. Date: May 28, 2015

(65) Prior Publication Data
US 2016/0296309 A1    Oct. 13, 2016

Related U.S. Application Data

(60) Provisional application No. 61/907,197, filed on Nov. 21, 2013.

(51) Int. Cl.
*A61C 17/022* (2006.01)
*A61C 15/00* (2006.01)
(Continued)

(52) U.S. Cl.
CPC ............ *A61C 17/022* (2013.01); *A61C 1/055* (2013.01); *A61C 15/00* (2013.01); *A61C 17/028* (2013.01);
(Continued)

(58) Field of Classification Search
CPC ..... A61C 1/00; A61C 1/05–055; A61C 15/00; A61C 17/00; A61C 17/02;
(Continued)

(56) References Cited

U.S. PATENT DOCUMENTS 3,039,123 A    6/1962  Brucker et al.
3,828,771 A *  8/1974  Gartner .............. A61C 17/0217
                                                    601/165

(Continued)

FOREIGN PATENT DOCUMENTS

CN    102458298 A    5/2012
CN    102846392 A    1/2013
(Continued)

*Primary Examiner* — Quang D Thanh
*Assistant Examiner* — Jacqueline M Pinderski

(57) ABSTRACT

The interproximal toothbrush includes an appliance body and neck with a nozzle member having a nozzle tip shaped to fit into interproximal teeth spaces. Bursts of air or air/liquid mixture are generated, exiting through the nozzle tip. A helix member or, alternatively, a spring, is supported within a channel in the nozzle member. The helix member is free to rotate as air or the air/liquid mixture is moved through the channel. A set of bristles is attached to a forward end of the helix member, so that it rotates with the helix member. Alternatively, a set of bristles is attached to the distal end of the spring so that successive bursts of air or the air/liquid mixture produce an in-and-out movement of the set of bristles toward and away from the teeth.

12 Claims, 5 Drawing Sheets

(51) Int. Cl.
  *A61C 17/028* (2006.01)
  *A61C 1/05* (2006.01)
  *A61C 17/02* (2006.01)
  *A61C 17/22* (2006.01)
  *A61C 17/24* (2006.01)

(52) U.S. Cl.
  CPC ........ *A61C 17/0217* (2013.01); *A61C 17/222* (2013.01); *A61C 17/225* (2013.01); *A61C 17/24* (2013.01); *A46B 2200/108* (2013.01); *A61C 1/05* (2013.01)

(58) Field of Classification Search
  CPC ........ A61C 17/0217–028; A61C 17/22; A61C 17/222; A61C 17/225; A61C 17/24–30; A61B 11/00; A61B 11/001; A61B 11/002; A61B 11/0041; A61B 11/06; A61B 11/063; A61B 2200/1066–1086
  See application file for complete search history.

(56) References Cited

U.S. PATENT DOCUMENTS

| | | | |
|---|---|---|---|
| 3,927,434 A * | 12/1975 | Burgess | A46B 13/06 15/24 |
| 4,207,640 A | 6/1980 | Sekula et al. | |
| 4,279,051 A | 7/1981 | Malcolm | |
| 4,783,871 A | 11/1988 | Rich, Jr. | |
| 6,030,215 A * | 2/2000 | Ellion | A46B 11/001 222/324 |
| 6,264,119 B1 * | 7/2001 | Truong | A61C 1/0076 15/29 |
| 8,454,360 B2 * | 6/2013 | Janssen | A61C 17/0217 433/88 |
| 2004/0067466 A1 | 4/2004 | Ito et al. | |
| 2010/0035200 A1 * | 2/2010 | Janssen | A61C 17/028 433/32 |
| 2010/0167236 A1 | 7/2010 | Edwards et al. | |
| 2011/0207078 A1 * | 8/2011 | Johnson | A61C 17/0217 433/88 |
| 2012/0107765 A1 * | 5/2012 | Kloster | A61C 17/0202 433/89 |
| 2012/0141953 A1 * | 6/2012 | Mueller | A61C 3/025 433/88 |
| 2012/0266396 A1 | 10/2012 | Leung | |

FOREIGN PATENT DOCUMENTS

| | | |
|---|---|---|
| RU | 2003129234 A | 4/2005 |
| WO | 2009-04-30 A1 | 4/2009 |
| WO | 2010140660 A1 | 12/2010 |
| WO | 2012042445 A1 | 4/2012 |
| WO | 2013000208 A1 | 1/2013 |
| WO | 2013001462 A2 | 1/2013 |
| WO | 2013061251 S1 | 5/2013 |

\* cited by examiner

AIR-DRIVEN INTERPROXIMAL TOOTHBRUSH

CROSS-REFERENCE TO PRIOR APPLICATIONS

This application is the U.S. National Phase application under 35 U.S.C. § 371 of International Application No. PCT/IB2014/066184, filed on Nov. 20, 2014, which claims the benefit of U.S. Provisional Patent Application No. 61/907,197, filed on Nov. 21, 2013. These applications are hereby incorporated by reference herein.

TECHNICAL FIELD

This invention relates generally to appliances which clean interproximal teeth areas using bursts of air or a mix of air and liquid, and more specifically concerns such an appliance which includes a set of bristles moved by air action for additional cleaning capability.

BACKGROUND OF THE INVENTION

Appliances are known for cleaning interproximal spaces using bursts, either spray or jet, of air or a mixture of air and liquid. Typically, such an appliance includes a handle and an elongated neck with a nozzle having a tip portion which mates with the interproximal teeth surfaces. However, while these appliances are typically effective in cleaning material from between interproximal teeth in many users, they are often limited in their ability to access tight interproximal spaces, as well as being limited in the physical area of cleaning and also a lack of a plaque removing ability.

Improvements to such appliances addressing one or more of the disadvantages noted above would be desirable.

SUMMARY OF THE INVENTION

Accordingly, an air-driven interproximal cleansing apparatus comprises: an appliance body having a handle member and an extended neck member, with a nozzle member at the distal end of the neck member, the nozzle member having a nozzle tip, with an exit opening, shaped to fit into interproximal teeth spaces; a source of air providing bursts of air or an air/liquid mixture when the appliance is activated successively by the user; and a solid helix member having at least one full turn, supported within a channel in the nozzle member, so that it is free to rotate as air or the air/liquid mixture is moved through the channel, the helix member having a set of bristles attached to a forward end thereof, such that the set of bristles rotate with rotation of the helix when air or the air/liquid mixture moves through the channel and out the exit opening of the nozzle tip, rotating the bristles for cleansing of the interproximal teeth surfaces.

BEST MODE OF CARRYING OUT THE INVENTION

Figure 1:
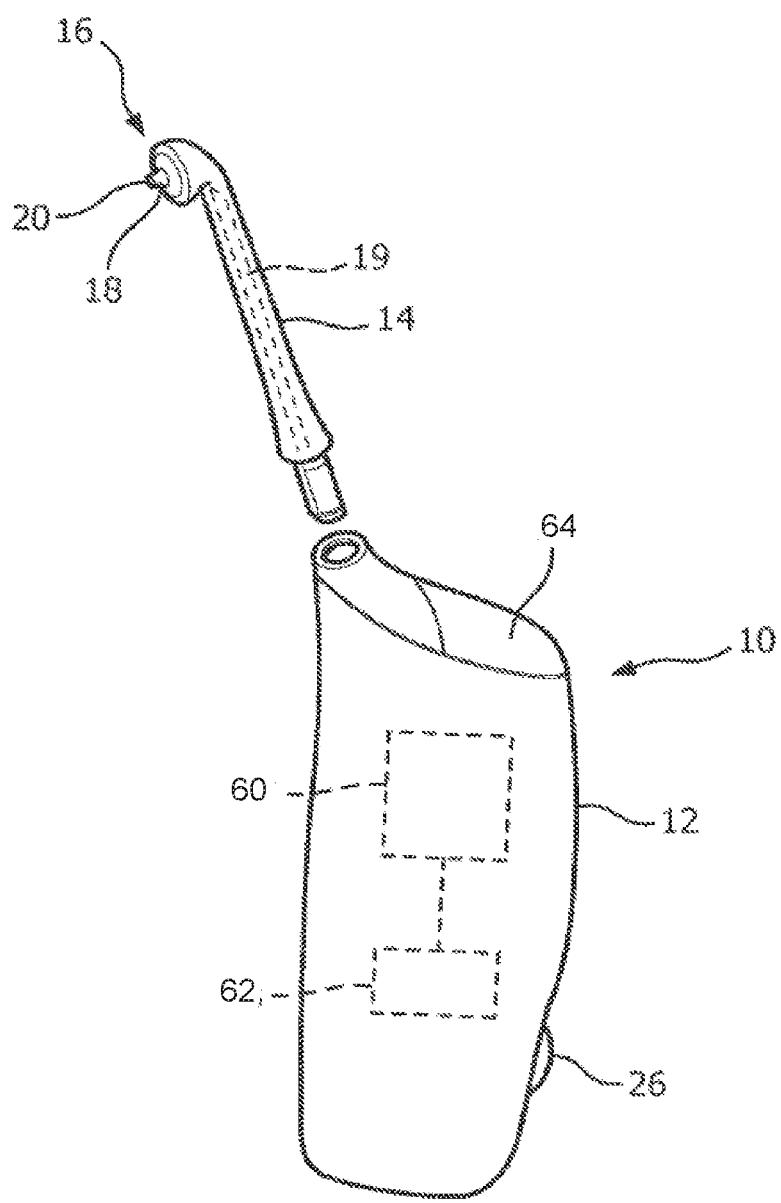
FIG. 1 is a schematic view of an air-driven interproximal cleaner.

FIG. 1 shows an air-driven interproximal dental cleaning appliance generally at 10. The appliance 10 in operation produces successive bursts, either spray or jet, of a mixture of air and liquid or just air, referred to hereafter generally as bursts of air, for reasons of clarity and simplicity. The successive bursts of air are used for cleaning the interproximal and gingival areas of the teeth. It potentially has beneficial effects similar to flossing, and is advantageous for those who have difficulty with or are uncomfortable with flossing. Used on a regular basis, the cleaning appliance of FIG. 1 is an effective alternative to flossing.

The appliance 10 includes a handle portion 12 and an elongated neck portion 14, at the end of which is a nozzle portion 16. Located at the distal end of the nozzle portion in a nozzle tip 18 configured to fit into interproximal spaces. The tip will typically contact the interproximal teeth surfaces.

An air burst generating system is shown at 60 and a power source therefor at 62, which can be rechargeable batteries.

More detail and explanation of such a system is described in Patent Application Ser. No. 61/387,527, owned by the assignee of the present invention, the contents of which are incorporated by reference herein.

Referring still to FIG. 1, neck 14 extends away from the handle and is relatively slim so that the nozzle portion thereof can conveniently fit into the mouth of the user and access the interproximal surfaces.

The tip of the nozzle portion 18 has a small exit 20 in a forwardly extending part thereof, through which the successive bursts of air are directed to the teeth. The nozzle member includes a channel 19 therethrough, ending at exit 20. In one embodiment, the channel 19 is typically one millimeter in diameter, but can vary over a range of 3-5 millimeters. The nozzle member has an exterior surface configured to facilitate contact with and placement in the interproximal areas of the teeth, with the tip extending into the interproximal spaces. The handle 12 includes an on/off switch 26 and a control member 64, which when operated produces a burst of air.

Typically, the neck portion 14 with the nozzle portion 16 is removable from the handle 12 so that it can be conveniently replaced or cleaned as necessary.

The following description concerns improvement embodiments for such an air-driven cleaning appliance described above, which fit within the nozzle portion and which include a brush portion mounted at a distal end thereof.

Figure 2:
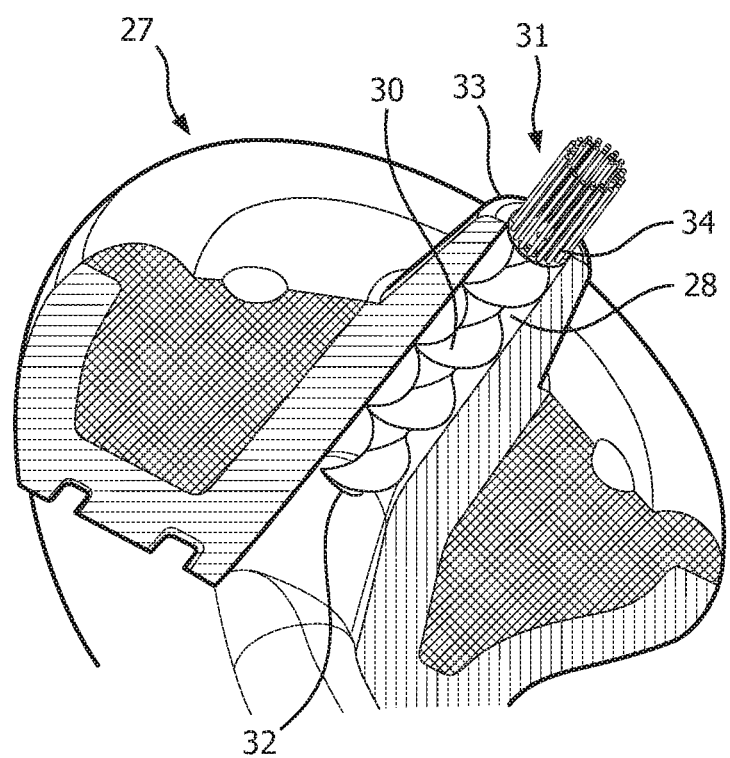
FIG. 2 is a cutaway view of a nozzle member of an air-driven interproximal cleaner showing one improvement embodiment.
Figure 3:
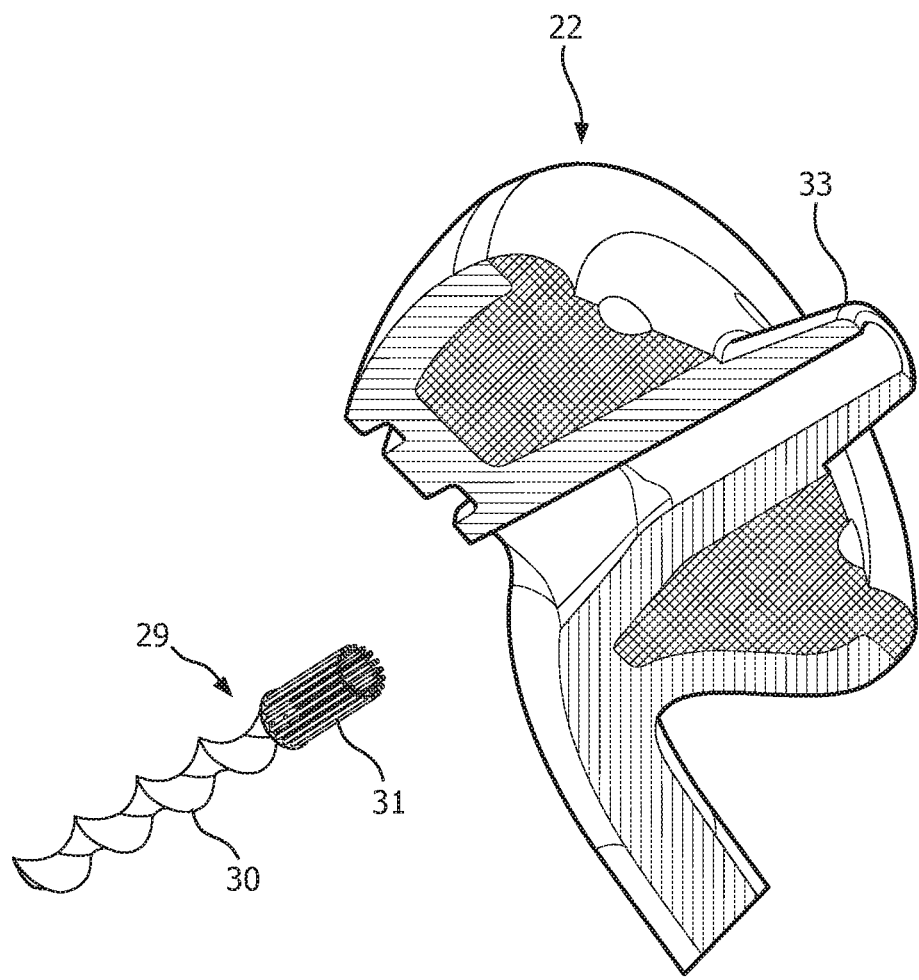
FIG. 3 is an exploded view of FIG. 1.
Figure 4:
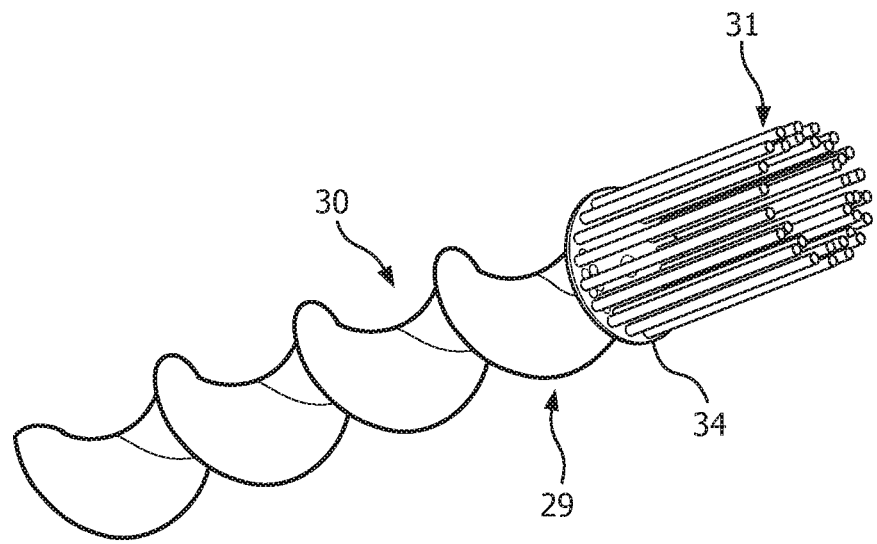
FIG. 4 is a schematic view of the air-driven bristle assembly shown in FIG. 1.

FIGS. 2-4 show one improvement embodiment.

A nozzle portion is shown at 27, with a channel 28 therethrough. The diameter of the channel will vary between 3 and 10 millimeters. A brush assembly 29 includes a helix member 30 and a bristle set portion 31 at a forward end thereof. The diameter of the helix member in the embodiment shown is between 2 and 5 millimeters; the helix member is typically made from plastic. Typically, but not necessarily, the helix member 30 includes five turns, although one turn can be sufficient. The helix member is rotatably supported within the channel by elements 32 and 34 at opposing ends thereof. It is free to rotate, but not to move back and forth within the channel.

The bristle set can be attached in various ways, including by glue or mechanical pressing into the distal end supporting element 34. The bristle set can include a number of individual tufts, with perhaps 50 or so bristles in each tuft, although this can be varied.

The air generating system in the handle is established so as to produce an air velocity between 30 and 170 meters per second, with a preferred velocity of approximately 50 meters per second. The volume of each air burst is between 0.05 to 0.2 milliliters. This produces a rapid turning of the helix member, resulting in a tornado-like turbulence flow of air. The flow can either be in the form of a jet or a spray, as indicated above, and can be air or an air/liquid mixture. The liquid can be water or other liquids, such as a mouthwash. The action produces a momentum of 0.009 to 0.005 kilograms-meter per second. The resulting action produces a high shear force on the teeth surfaces by action of the bristles. The air or air/liquid mixture moving around the helix exits through the extending tip 33 of the nozzle.

In a modification, the helix member can include a flow channel through the middle of the helix, exiting in the middle of the bristle set. This provides an additional cleaning effect along with the rotating action of the bristles and the movement of turbulent air flow at the end of the helix.

Figure 5:
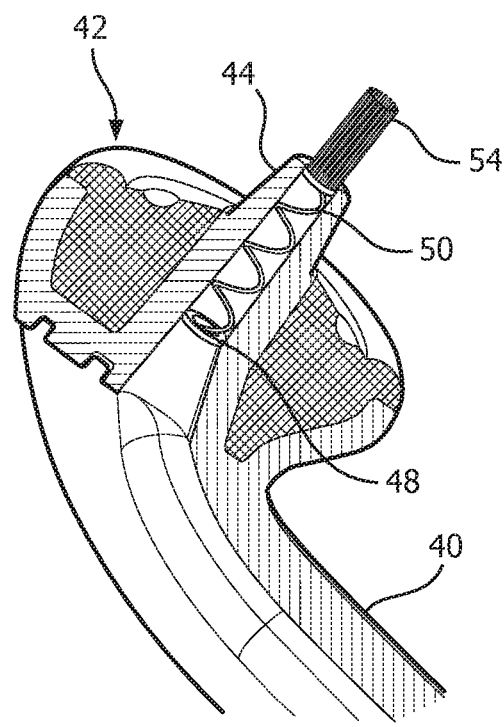
FIG. 5 is a cutaway view of a nozzle member showing a second improvement embodiment.
Figure 6:
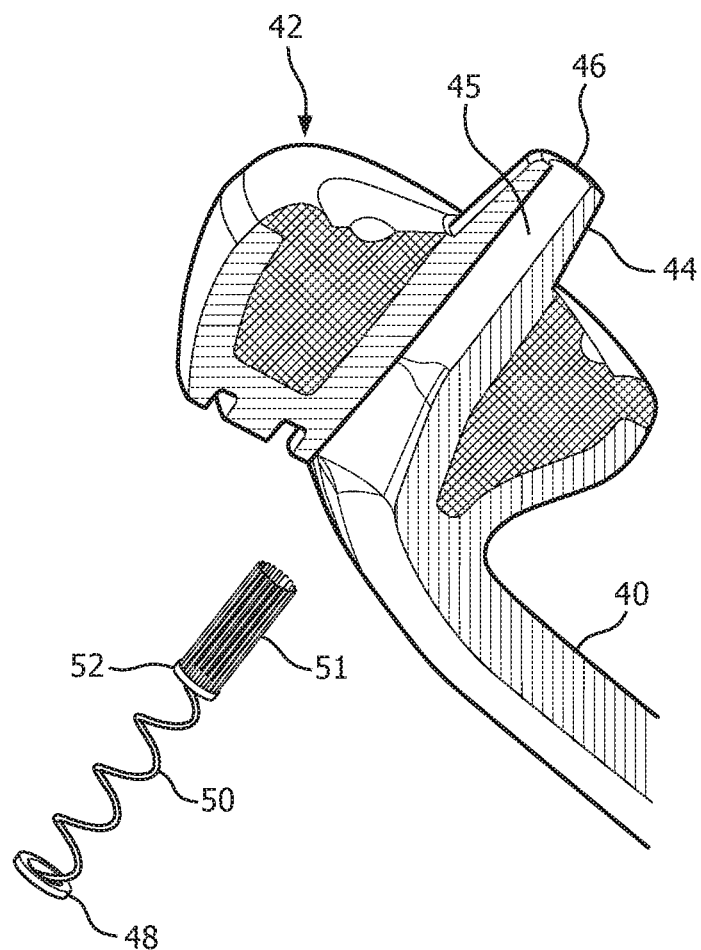
FIG. 6 is an exploded view of FIG. 5.

Another embodiment is shown in FIGS. 5 and 6. Both figures show portions of an elongated neck 40 of an interproximal cleaning appliance, as well as a similar nozzle member 42 with extended tip portion 44. The nozzle member 42 includes a channel 45 which extends to the tip portion exit 46. Channel 45 has a diameter of approximately 3 to 10 millimeters, with a preferred diameter of approximately 5 mm. This embodiment includes a spring member 50, positioned within channel 45 and extending from a fixed support member 48 within the channel to exit 46 of the tip portion. The spring member 50 is typically made of metal, but also could be plastic. At a distal end of the spring member is a flat bristle support element 52 with a set of bristles 54 mounted thereon. The support member could be a plate with openings to permit air to move through, or a ring. A substantial amount of air does move against the support member, moving the spring to an extended position, typically, approximately 1 mm beyond the exit of the nozzle tip. The appliance provides bursts of air or an air/liquid mixture, in either a spray or jet form, approximately 5 milliseconds in duration for the actual burst, although the total time for a one burst process is approximately 50 ms from beginning to end. The bursts can be programmed to continue automatically in sequence or for a selected number of bursts, including one per activation by the user. In operation, the spring is extended and then relaxed coincident with the successive bursts of air. This produces an in and out "jack hammer" effect of the bristles against the teeth, producing a mechanical cleansing action of the surface of the teeth, including the interproximal areas. This is in addition to the air or air/liquid mixture which moves through the channel and out the exit to continue to provide interproximal cleansing.

Although a preferred embodiment of the invention has been disclosed for purposes of illustration, it should be understood that various changes, modifications and substitutions may be incorporated in the embodiment without departing from the spirit of the invention which is defined by the claims which follow.

What is claimed is:

1. An air-driven interproximal cleansing appliance, comprising:
   an appliance body having a handle portion and a nozzle having an extended neck, a nozzle tip, and an exit opening at a distal end of the nozzle, shaped to fit into spaces between interproximal teeth surfaces;
   a source of air for providing bursts of air or bursts of an air/liquid mixture in response to the appliance being activated successively, via control member by a user; and
   a helix member having at least one full turn, supported within a channel extending in a longitudinal direction in the nozzle tip, so that the helix member is free to rotate as the bursts of air or the bursts of the air/liquid mixture are moved through the channel, the helix member further comprising a flow channel through a center of the helix member, the helix member further having a planar support structure comprising a flat plate extending across the channel and having an exit aperture connected to the flow channel, the support structure further having a set of bristles attached to a forward end thereof and around an edge of the support structure, the set of bristles extending in the longitudinal direction, such that the set of bristles rotates with rotation of the helix member in response to the bursts of air or the bursts of the air/liquid mixture being moved through the channel and out the exit opening of the nozzle tip, rotating the set of bristles for cleansing of the interproximal teeth surfaces.

2. The appliance of claim 1, wherein the bursts of the air/liquid comprise a spray or jet.

3. The appliance of claim 1, wherein the helix member comprises between one and five turns.

4. The appliance of claim 1, wherein the air flows within the channel in the nozzle tip and out the exit opening turbulently.

5. The appliance of claim 1, wherein the channel has a diameter within the range of 3-10 millimeters.

6. The appliance of claim 1, wherein the helix has a diameter of approximately 2-5 millimeters.

7. The appliance of claim 1, wherein a volume of each air burst is 0.05 milliliters to 0.2 milliliters.

8. The appliance of claim 1, wherein a velocity of the air bursts is 50-170 meters per second.

9. The appliance of claim 1, wherein the rotation of the helix member in response to the bursts of air or the bursts of the air/liquid mixture being moved through the channel and out the exit opening of the nozzle tip produces a momentum for the bursts of the air/liquid mixture that is approximately 0.009 to 0.005 kilogram meters per second.

10. The appliance of claim 1, wherein the set of bristles surrounds the exit opening.

11. The appliance of claim 1, wherein the liquid is water.

12. The appliance of claim 1, wherein the exit aperture is arranged in the middle of the planar support structure and the set of bristles.

* * * * *